3,272,785
METHOD OF THERMOSETTING HYDROXYL-
CONTAINING ESTER POLYMERS
Sheldon N. Lewis, Willow Grove, and Andrew Mercurio, Philadelphia, Pa., assignors to Rohm & Haas Company, Philadelphia, Pa., a corporation of Delaware
No Drawing. Filed June 10, 1963, Ser. No. 286,462
7 Claims. (Cl. 260—80.5)

The present invention relates to an improved method of thermosetting or curing hydroxyl-containing ester polymers.

It is known that polymers containing hydroxyl and carboxyl groups can be cured to an insoluble condition by heating in the presence of acidic catalysts. The present invention is based upon the surprising discovery that polymers containing hydroxyl groups but not containing carboxyl groups can be cured to an insoluble condition in a highly efficient manner by the use of certain catalysts.

In accordance with the present invention, it has been found that compositions containing as the sole polymeric components (1) certain hydroxyl-containing polymers of esters of $\alpha,\beta$-monoethylenically unsaturated acids or (2) a mixture of a certain type of hydroxyl-containing polymer and a polymer of an ester as just defined can be insolubilized to an extraordinary extent even though the polymers in the composition contain no carboxyl groups by heating the polymer while in contact with magnesium perchlorate, or preferably, zinc perchlorate.

In one embodiment of the present invention, a single type of polymer is used and this polymer has a molecular weight of at least 1500 up to several million, such as 10 million or more, and it contains at least 2% by weight of units containing hydroxyl groups and at least 2% by weight of units of an ester of an $\alpha,\beta$-monoethylenically unsaturated acid. The hydroxyl group may be in the aforesaid ester units or it may be in another type of unit entirely. Preferably, the copolymer contains at least 5% by weight of the hydroxyl-containing units and at least 5% by weight of units of an ester of an $\alpha,\beta$-monoethylenically unsaturated acid. The polymer may be a homopolymer of a hydroxyl-containing ester of an $\alpha,\beta$-monoethylenically unsaturated acid. The polymer may be insoluble in water or it may be soluble in water. In general, preferred compositions are those in which the film-forming polymer consists of a copolymer containing 5 to 50% by weight of polymerized units containing a hydroxyl group and from 5 to 95% by weight of units of at least one ester of an $\alpha,\beta$-monoethylenically unsaturated acid.

In another embodiment of the invention, the composition is formed of a mixture or blend of at least one hydroxyl-containing polymer and of at least one polymer of at least one ester of an $\alpha,\beta$-monoethylenically unsaturated acid and in this embodiment, the polymerized units containing the hydroxyl group must amount to at least 2%, and preferably at least 5%, by weight of the total polymer weight of the blend. The ester content must also be at least 2%, and is preferably at least 5%, by weight of the polymer blend.

The polymers to be cured in accordance with the invention can be made by polymerizing at least one hydroxyl-containing monomer which may be any polymerizable unsaturated compound selected from the group consisting of neutral and acid compounds containing an alcoholic hydroxyl attached to a carbon atom which is directly attached solely to atoms selected from the group consisting of carbon and hydrogen atoms. The polymers to be cured in accordance with the present invention are selected from the group consisting of neutral and acid polymers formed exclusively of atoms selected from the group consisting of C, H, N, halogen, S and O. Examples of such monomers include:

(1) Esters of $\alpha$-hydroxyalkyl-$\alpha,\beta$-monoethylenically unsaturated acids,
(2) Hydroxy-($C_2$–$C_{18}$)-alkyl esters of $\alpha,\beta$-monoethylenically unsaturated acids,
(3) N-hydroxy-($C_2$–$C_{18}$)-alkyl amides of $\alpha,\beta$-monoethylenically unsaturated acids, and
(4) Hydroxy-($C_2$–$C_{10}$)-alkyl vinyl ethers or sulfides.

In place of the alkyl moiety of the hydroxyalkyl groups mentioned in these four types of compounds there may be used a group of the formula $-C_xH_{2x}(AC_xH_{2x})_m-$ in which A is selected from the group consisting of O and S, $x$ is an integer having a value of 2 to 3 and $m$ is a whole number, e.g. 1 to 10 and preferably 1 to 3.

The hydroxyl-containing polymer may be made by polymerizing a monomer which lacks hydroxyl groups but can be modified after polymerization to introduce the hydroxyl group. For example, this embraces vinyl alcohol units, e.g. in partially or completely hydrolyzed vinyl ester (e.g. vinyl acetate, vinyl stearate, or the like) homopolymers or copolymers. Again, copolymers containing carboxyl, or amide groups can be reacted with an alkylene oxide, e.g., ethylene oxide or propylene oxide, or with an epihalohydrin, such as epichlorohydrin to introduce hydroxyl groups in known manner.

If the hydroxyl-containing units are not polymerized units of an ester of an $\alpha,\beta$-monoethylenically unsaturated acid, such hydroxyl units must be present in a polymer system, either a copolymer or a blend, comprising a polymer of such an ester. Examples of esters that are suitable include esters of an acid of the formula

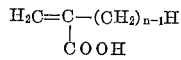

in which $n$ is an integer having a value of 1 to 2, with a saturated aliphatic alcohol having 1 to 18 carbon atoms, including the alkanols, cyclohexanol, benzyl alcohol and alkyl-substituted cyclohexanols and benzyl alcohols. Of these esters, those preferred are the acrylates and methacrylates of an alkanol having 1 to 8 carbon atoms, such as methyl acrylate, methyl methacrylate, ethyl acrylate, butyl acrylate, 2-ethylhexyl methacrylate, and so on. The neutral or dialkyl esters of such acids as maleic, itaconic, aconitic, fumaric, and citraconic may also be used, the preferred ones being derived from the ($C_1$–$C_4$)-alkanols, such as diethyl itaconate.

While the polymers may consist of those containing the hydroxyl groups and the esters as defined either as a copolymer or a blend, the polymers may also comprise units, in an amount up to 98%, but preferably not over 95%, by weight of the copolymer or of the polymer blend, of acrylonitrile, methacrylonitrile, vinyl esters, such as vinyl acetate, or vinyl chloride, vinylidene chloride, vinyl aromatic compounds, such as styrene, vinyltoluene ($o$, $m$, or $p$ or mixtures). For special purposes, the copolymers may also contain from 1 to 5% by weight of acrylic acid, methacrylic acid, itaconic acid, acrylamide, or methacrylamide. These groups may also increase the degree of insolubilization, but they are not necessary to produce the outstanding thermosettability of the hydroxyl-containing polymer system used in the present invention.

Examples of the vinyl sulfide or vinyl ether monomers which can be used to introduce hydroxyl groups into the polymer system used in the present invention include:

$\beta$-Hydroxytheyl vinyl sulfide
$\beta$-Hydroxyethyl vinyl ether
$\gamma$-Hydroxypropyl vinyl sulfide
5-hydroxypentyl vinyl ether
6-hydroxyhexyl vinyl ether
8-hydroxyoctyl vinyl ether 10-hydroxydecyl vinyl ether
Thiodiglycol monovinyl ether
Thiodiglycol monovinyl sulfide
Diethyleneglycol monovinyl ether Examples of N-hydroxyalkyl amides include:

N-(β-hydroxyethyl)-acrylamide,
N-(β-hydroxypropyl)-methacrylamide
N-(β-hydroxyethyl)-itaconamide Monomers adapted to provide both the required hydroxyl and ester components in the polymer system include: 2-hydroxyethyl acrylate, methyl α-(hydroxymethyl)-acrylate, ethyl α-(-hydroxymethyl)-acrylate, butyl α-(2-hydroxyethyl)-acrylate, 2-hydroxypropyl acrylate or methacrylate, 3-hydroxypropyl acrylate or methacrylate, methyl α-(2-hydroxypropyl)-acrylate, ethyl α-(3-hydroxypropyl)-acrylate, 4-hydroxybutyl acrylate, 5-hydroxyamyl acrylate, 6-hydroxyhexyl acrylate, 7-hydroxyheptyl acrylate, 8-hydroxyoctyl acrylate, 9-hydroxynonyl acrylate, 10-hydroxydecyl acrylate, 2-hydroxyethyl methacrylate, 6-hydroxyhexyl methacrylate, 8-hydroxyoctyl methacrylate, 10-hydroxydecyl methacrylate, 3 - hydroxypropyl crotonate, 5 - hydroxyamyl crotonate, 6-hydroxyhexyl crotonate, 7-hydroxyheptyl crotonate, 10-hydroxydecyl crotonate, di(2-hydroxyethyl)maleate, di(4-hydroxybutyl)-maleate, di(6-hydroxyhexyl)maleate, di(9-hydroxynonyl)maleate, di(10-hydroxydecyl)maleate, di(2 - hydroxyethyl)fumarate, di(4-hydroxybutyl)fumarate, di(6 - hydroxyhexyl)fumarate, di(10-hydroxydecyl)fumarate, and the like. Additionally, other substituents may be incorporated into the alkyl chain, including secondary hydroxy groups, halide radicals, nitrile radicals, and the like, such as 2,3-dihydroxypropyl acrylate, 3,5-dihydroxyamyl crotonate, 6,10-dihydroxydecyl methacrylate, di-2,6-dihydroxyhexyl maleate, di-2-chloro 7-hydroxyheptyl fumarate and the like. In all cases, the hydroxyl of each hydroxyalkyl group is at least two carbon atoms removed from the carbon atom of the adjacent —COO-radical in the ester.

Preferred polymer systems are those which contain a small amount of an α,β-monoethylenically unsaturated acid polymerized therein, such as from 1 to 5% by weight of the acid based on the total weight of the polymerized material to be cross-linked, and in at least an amount sufficient to complex the zinc ions introduced into the system by the catalyst, i.e. the amount of acid should be at least the stoichiometric equivalent of the zinc present. Such systems provide improved resistance to attack by moisture to corrosion of the substrate, and to solvents in general.

The compositions of the present invention containing the polymerized units having hydroxyl groups and/or ester groups as defined may be used either in a bulk system or in the form of a solution of aqueous character or in an organic solvent. In addition, emulsion polymers may be prepared containing the hydroxyl groups and ester units either in a single polymer or copolymer or in a blend of two different types of polymers, one having the hydroxyl groups and the other the necessary ester units. Regardless of the nature of the polymeric system, the curing of the system is effected by incorporating within the polymer system from about 0.1 to 5% by weight, based on the polymer solids of the system, of magnesium perchlorate or preferably of zinc perchlorate. In general, the higher the molecular weight of the polymers in the system, the smaller the amount of catalyst that is required and the smaller the proportion of hydroxyl-containing units and ester units required in the polymer or polymers of the system.

For preparing a molded or cast article the catalyst is mixed with a powder of the solid polymer or polymers, or it may be mixed into a solution or dispersion of the polymers in the proper proportion after which the solvent or dispersant medium may be removed by evaporation at room temperature or distillation under a vacuum at low temperature.

In the preparation of coating and impregnating compositions, the hydroxyl-containing and ester-containing polymer system may be of a type which is water-insoluble but is prepared as by emulsion polymerization in the form of an aqueous dispersion. Alternatively, a water-soluble or insoluble polymer or mixture of polymers may be dissolved in an organic solvent or prepared by polymerization in an organic solvent to form the solution directly. Examples of organic solvents include the hydrocarbons such as benzene, toluene, xylenes, aromatic naphthas, the chlorinated hydrocarbons such as ethylene dichloride, chloroform, carbon tetrachloride, etc., alcohols such as ethanol, isopropanol, n-butanol, tert-butanol, ethers such as 2-ethoxyethanol, 2-butoxyethanol, dioxane, ketones such as acetone, methylisopropyl ketone, methylisobutyl ketone, esters such as amyl acetate, 2-ethoxyethyl acetate, etc.

When the polymer or polymers contain a large proportion of hydroxyl units and a low proportion of hydrophobic content, the resulting polymer system is generally water-soluble and can be employed as a solution in water. When employing the solutions either in water or an organic solvent, the concentrations may be from about 1% up to 25% or more, and is preferably in the range of about 10 to 20% for most uses in impregnation and coating systems. Aqueous dispersions of water-insoluble polymers, however, may have concentrations from 1% to as high as 70%, and still be sufficiently fluid to be easily applied for these purposes in any portion of the concentration range mentioned.

The molding compositions may be heated to fuse and cure the polymers to insoluble condition. The solutions or dispersions are applied to the substrates and dried and then cured by heating. With the perchlorate catalysts mentioned curing may be effected as low as 200° to 225° F., though temperatures as high as 450° F. for a period of about ½ minute to about an hour may conveniently be used to hasten the cure.

The compositions may be employed to form molded articles having a wide varitety of properties. They have good flexibility and impact resistance and can be cured to a condition in which they are quite resistant to attack by water and organic solvents and are resistant to deformation on heating to such temperatures that are normally encountered in use.

The molding compositions as well as the solutions and dispersions may be modified by the incorporation of pigments and dyes and molding lubricants and release agents.

Pigments suitable for use according to the invention are inorganic pigments such as, for example, chrome yellows, Prussian blues and Brunswick greens, titanium pigments such as titanium dioxide, extended titanium pigments (extended with either precipitated or natural extenders, such as alkali earth sulfate for instance calcium sulfate, barium sulfate, and the like), tinted titanium pigments, titanates such as barium, zinc, lead, magnesium titanates, and the like. Additionally, other types of inorganic pigments might be included, such as zinc sulfide pigments, for instance, zinc sulfide, lithopone, other extended zinc sulfide pigments, such as calcium base lithopone, zinc sulfide extended with natural extenders and the like, zinc oxide and antimony oxide, or organic pigments; that is, organic coloring matters which are devoid of sulfonic, carboxylic, or other water-solubilizing groups. Also, for the purposes of this invention, we include in the term "pigment" other water-insoluble organic coloring matters such as, for example, the calcium or barium lakes of azo lake dyestuffs.

The compositions herein may be applied for the coating of a wide variety of substrates including paper, textiles, leather, wood ceramics, brick, stone, and concrete surfaces, as well as metals. Thus, they may be used as finishing topcoats for automobiles or for the decoration of metals in general, such as tin cans or other canisters. They are particularly suitable for the finishing of household appliances, such as stoves, refrigerators, and so on because of their resistance to modern detergents.

One of the outstanding advantages of the present invention is the fact that a low temperature of 200 to 220° F. or thereabout is adequate to produce a well-cured product, whereas the compositions of the prior art utilizing hydroxyl-containing copolymers generally required a higher temperature in order to obtain equivalent curing in a given period of time.

In the examples which follow and are illustrative of the present invention, the parts and percentages are by weight unless otherwise specified.

*Example 1*

To 200 parts of a 50% solution in xylene of a copolymer of 45 parts methyl methacrylate, 45 parts ethyl acrylate, 10 parts β-hydroxyethyl methacrylate, there was added 5 parts of a 20% zinc perchlorate solution in n-butanol (representing 1% catalyst based on acrylic copolymer solids). This composition was spread onto cold-rolled steel to a 1.5 mil dried film thickness and baked at 300° F. for thirty minutes. For comparison, another portion of the copolymer solution without added zinc perchlorate was also baked onto cold rolled steel at 300° F. for thirty minutes.

The clear coating, cured in the presence of zinc perchlorate, successfully passed a bend over a mandrel of ⅛ inch diameter, had 20 inch-lbs. of reverse impact resistance (as measured by a Gardner Laboratory Impact Tester) showed excellent adhesion, and softened only to a 6B pencil hardness after fifteen minutes exposure to 2-ethoxyethyl acetate. In contrast, the sample heated without catalyst, had poor flexibility, poor adhesion, no reverse impact resistance, and it dissolved in 2-ethoxyethyl acetate.

*Example 2*

To 200 parts of a 50% solution in xylene of a copolymer of 90 parts styrene, 10 parts β-hydroxyethyl methacrylate, was added 10 parts of a 20% zinc perchlorate solution in n-butanol. This composition was spread onto cold-rolled steel to a 1.5 mil dried film thickness and baked at 300° F. for thirty minutes. For comparison, another portion of the copolymer solution without added zinc perchlorate was also baked onto cold-rolled steel at 300° F. for thirty minutes.

The sample heated without catalyst was cracked and crazed when observed at room temperature and moreover it dissolved in xylene. However, the film cured according to this invention was smooth and continuous and merely softened to 6B pencil hardness when immersed in xylene for fifteen minutes.

*Example 3*

Example 1 herein was repeated substituting 10 parts of a 20% solution of magnesium perchlorate in 2-ethoxyethyl acetate in place of the zinc perchlorate solution. A dried 1.5 mil clear film cast of the above solution on cold-rolled steel, baked at 350° F. for thirty minutes or at 500° F. for five minutes, exhibited film properties which were indistinguishable from those in Example 1.

*Example 4*

To 100 parts of a solventless, low molecular weight (500–2000 number average) copolymer of 69.4 parts butyl acrylate and 30.6 parts β-hydroxylethyl methacrylate there was added 25 parts xylene, 22 parts diacetone alcohol, and 10 parts of a 20% solution of zinc perchlorate in 2-methoxy ethanol (representing 2 percent catalyst based on acrylic copolymer).

A dried 1.5 mil film of the above solution on an appliance grade of phosphatized steel available under the name Bonderite 1000, baked at 300° F. for thirty minutes, had excellent adhesion, outstanding flexibility over a ⅛ inch mandrel, a 2B pencil hardness, insolubility in 2-ethoxyethyl acetate, and lack of tack or stickiness when heated at 180° F. in contact with cheesecloth under a load of two lbs. per square inch.

*Example 5*

An aqueous dispersion was prepared by emulsion polymerization of a copolymer of 44.4% ethyl acrylate, 49.2% methyl methacrylate, and 6.4% of β-hydroxyethyl methacrylate. The latex had a pH of 3.0, a solids content of 43.8% and a Brookfield viscosity of 44 centipoise at room temperature. To this latex emulsion was added 40 grams of a 10% zinc perchlorate solution in water.

A clear film baked for thirty minutes at 300° F. was immersed in toluene several hours at room temperature and the ratio of swollen to unswollen volume was 3.8 which indicated excellent crosslinking.

*Example 6*

A 50% solution in xylene of a copolymer of 22.5 parts styrene, 20.5 parts methyl methacrylate, 45 parts ethyl acrylate, 10 parts β-hydroxypropyl methacrylate, 2 parts methacrylic acid, was made into an enamel according to the following formulation.

Paste prepared on three-roll mill:
    Titanium dioxide pigment _____parts__ 100.0
    Copolymer solution _____do____ 100.1
Paste letdown:
    Copolymer solution _____do____ 122.0
    Zinc perchlorate solution in n-butanol_do____ 122.0
    2-ethoxyethyl acetate _____do____ 114.0
    Xylene _____do____ 38.0
Enamel constants:
    Pigment binder _____ 45/55
    Enamel viscosity on #4 Ford cup ____seconds__ 17
    Enamel solids _____percent__ 44

This enamel was then sprayed with conventional equipment onto Bonderite 1000 panels to a dried film thickness of 1.5 mils. After a bake at 300° F. for thirty minutes, the following coating properties were measured at room temperature; a 4H pencil hardness, excellent flexibility over a ⅛ inch mandrel, high gloss (90 as measured by the 60° Photovolt Gloss meter), a white visual color, softening to 5B and 6B pencil hardness after fifteen minutes exposure to xylene and 2-ethoxyethyl acetate respectively, and admirable hot detergent resistance as evidenced by the appearance of only a few number 8 blisters (as measured by ASTM D714–54T photographic standards) after 100 hours exposure at 165° F. to a 1% solution in water of the commercial detergent Tide.

*Example 7*

A 50% solution in xylene of a copolymer of 11.5 parts styrene, 11.5 parts methyl methacrylate, 45 parts ethyl acrylate, 30 parts β-hydroxyethyl methacrylate, 2 parts methacrylic acid, was made into an enamel by the same procedure used in example 6 herein. Enamel constants were:

Titanium dioxide/binder _____ 45/55
Enamel viscosity on #4 Ford cup _____seconds__ 18
Enamel solids _____percent__ 42

When the above enamel was sprayed onto Bonderite 1000 to a dried film thickness of 1.5 mils and baked at 300° F. for thirty minutes, a coating was obtained with original 4H pencil hardness, retention of 4H pencil hardness after 15 minutes immersion in xylene, excellent flexibility when bent over a ⅛ inch mandrel, and excellent hot detergent resistance as evidenced by the appearance of only a very few number 9 blisters (ASTM photographic standards) after 100 hours exposure to a 1% Tide solution in water at 165° F.

*Example 8*

A 50% solution in a mixture of 75 parts of a high-boiling solvent naphtha (Solvesso 150) and 25 parts of 2-ethoxyethyl acetate of a copolymer of 24 parts styrene, 67 parts ethyl acrylate, 7 parts β-hydroxypropyl methacrylate, 2 parts methacrylic acid was made into an enamel by the same procedure used in example 6 herein. Enamel constants were:

Titanium dioxide/binder _____ 50/50
Enamel viscosity on #4 Ford cup _____seconds__ 63
Enamel solids _____percent__ 64

This enamel was applied to tin-plated steel by direct roller coating using a gelatin roll. The dried film of 0.2 to 0.3 mil thickness was baked at 400° F. for ten minutes.

This coating had very good hot stacking properties as evidenced by lack of sticking of sheets placed with the coated sides face to face or face to back under a load of 10 p.s.i. at 120° F. for 16 hours. Moreover, the coating was able to withstand severe fabrication without cracking (28-mm. knurled and threaded screw caps were prepared from the coated, tin plated, steel sheet) and the severely fabricated pieces were able to resist one hour of dry heat at 250° F., or one hour of superheated steam at 250° F. without showing cracks or peeling failure.

We claim:

1. A method of curing a composition containing as the sole polymeric components, a polymerized material selected from the group consisting of (1) a polymer containing at least 2% by weight of units having an alcoholic hydroxyl group attached to a carbon atom which is directly attached solely to atoms selected from the group consisting of carbon and hydrogen, said polymers containing at least 2% by weight of units of at least one ester of an α,β-monoethylenically unsaturated acid, and (2) a mixture of (a) a polymer containing units having an alcoholic hydroxyl group attached to a carbon atom which is directly attached solely to atoms selected from the group consisting of carbon and hydrogen and (b) a polymer containing units of at least one ester of an α,β-monoethylenically unsaturated acid, the amount of the hydroxyl-containing units and the amount of the ester units each being at least 2% by weight, based on the weight of the mixture of polymers, which comprises heating the composition in contact with 0.1 to 5% by weight, based on the weight of polymerized material therein, of a compound selected from the group consisting of magnesium perchlorate, zinc perchlorate, and mixtures thereof.

2. A method of curing a composition containing as the sole polymeric component, a copolymer of 2 to 50% by weight of polymerized units having an alcoholic hydroxyl group attached to a carbon atom which is directly attached solely to atoms selected from the group consisting of carbon and hydrogen, the polymer containing from 2 to 100% by weight of polymerized units of at least one ester of an α,β-monoethylenically unsaturated acid, which comprises heating the composition, at a temperature of 200 to 450° F. and for a period of about ½ minute to about an hour, in contact with 0.1 to 5% by weight, based on the weight of copolymer therein, of a compound selected from the group consisting of magnesium perchlorate, zinc perchlorate, and mixtures thereof.

3. A method for protectively coating a substrate which comprises applying to a surface thereof a composition comprising as the sole polymeric component an acidic copolymer of 1 to 5% by weight of an α,β-monoethlenically unsaturated acid, 2 to 50% by weight of at least one monomer containing an aliphatic hydroxyl group attached to a carbon atom which is directly attached solely to atoms selected from the group consisting of carbon and hydrogen atoms, at least 2% by weight of the polymerized units in the copolymer being units derived from an ester of an α,β-monoethylenically unsaturated acid, and about 0.1 to 5% by weight, based on the weight of polymerized material therein, of a compound selected from the group consisting of magnesium perchlorate, zinc perchlorate, and mixtures thereof, subsequently drying, and curing the coating by heating to a temperature of 200 to 450° F. for a period of about ½ minute to about an hour.

4. A method of curing a polymer of 2 to 100% by weight of a β-hydroxyalkyl ester of an acid selected from the group consisting of acrylic acid and methacrylic acid in which the alkyl group has 2 to 3 carbon atoms which comprises heating the polymer in contact with 0.1 to 5% by weight, based on the weight of polymerized material therein, of a compound selected from the group consisting of magnesium perchlorate, zinc perchlorate, and mixtures thereof.

5. A method of curing a copolymer of 1 to 5% of an α,β-monoethylenically unsaturated acid, and 2 to 50% by weight of a β-hydoxylalkyl ester of an acid selected from the group consisting of acrylic acid and methacrylic acid in which the alkyl group has 2 to 3 carbon atoms which comprises heating the polymer in contact with 0.1 to 5% by weight, based on the weight of polymerized material therein, of a compound selected from the group consisting of magnesium perchlorate, zinc perchlorate, and mixtures thereof.

6. A method of curing a copolymer of 1 to 5% of an α,β-monoethylenically unsaturated acid, 2 to 50% by weight of a β-hydroxylalkyl ester of an acid selected from the group consisting of acrylic acid and methacrylic acid in which the alkyl group has 2 to 3 carbon atoms and, the balance to make 100%, of at least one monomer selected from the group consisting of acrylates and methacrylates of an alkanol having 1 to 8 carbon atoms, acrylonitrile, methacrylonitrile, vinyl acetate, vinyl chloride, vinylidene chloride, styrene, and vinyltoluene which comprises heating the copolymer in contact with 0.1 to 5% by weight, based on the weight of polymerized material therein, of a compound selected from the group consisting of magnesium perchlorate, zinc perchlorate, and mixtures thereof.

7. A method of curing a copolymer of 2 to 50% by weight of a β-hydroxylalkyl ester of an acid selected from the group consisting of acrylic acid and methacrylic acid in which the alkyl group has 2 to 3 carbon atoms and, the balance to make 100%, of at least one monomer selected from the group consisting of acrylates and methacrylates of an alkanol having 1 to 8 carbon atoms, acrylonitrile, methacrylonitrile, vinyl acetate, vinyl chloride, vinylidene chloride, styrene, and vinyltoluene which comprises heating the copolymer in contact with 0.1 to 5% by weight, based on the weight of polymerized material therein, of a compound selected from the group consisting of magnesium perchlorate, zinc perchlorate, and mixtures thereof.

No references cited.

JOSEPH L. SCHOFER, *Primary Examiner.*

W. HOOVER, *Assistant Examiner.*